United States Patent [19]
Ikemori

[11] 4,370,031
[45] * Jan. 25, 1983

[54] ZOOM OBJECTIVE OF SMALL SIZE

[75] Inventor: Keiji Ikemori, Yokohama, Japan

[73] Assignee: Canon Kabushiki Kaisha, Tokyo, Japan

[*] Notice: The portion of the term of this patent subsequent to Nov. 10, 1998, has been disclaimed.

[21] Appl. No.: 169,721

[22] Filed: Jul. 17, 1980

[30] Foreign Application Priority Data

Jul. 24, 1979 [JP] Japan .................................. 54-94088

[51] Int. Cl.³ .............................................. G02B 15/16
[52] U.S. Cl. ................................................. 350/426
[58] Field of Search ...................................... 350/426

[56] References Cited
U.S. PATENT DOCUMENTS 4,168,110 9/1979 Itoh ..................................... 350/426
4,294,521 10/1981 Doi et al. ........................... 350/426
4,299,452 11/1981 Ikemori ............................. 350/426

*Primary Examiner*—John K. Corbin
*Assistant Examiner*—Rebecca D. Gass
*Attorney, Agent, or Firm*—Toren, McGeady and Stanger

[57] ABSTRACT

In the disclosed zoom objective the spacing between divergent front and convergent rear lens groups is varied for zooming. From front to rear, the divergent group consists of a negative meniscus lens of forward convexity, a bi-concave lens and a positive meniscus lens of forward convexity, the bi-concave and positive meniscus lenses defining an air lens which has a converging effect. From front to rear, the convergent group consists of a positive lens with its front surface of strong curvature, two positive meniscus lenses of forward convexity, a negative lens and a positive lens. The zoom objective satisfies the following conditions:

$$1.08 \leq \frac{|Fl|}{Ft} < 1.255 \quad (1)$$

$$0.08 < \frac{Et}{Ft} < 0.195 \quad (2)$$

(3) $\nu 3 < 35$
(4) $32 < (\nu 1 \text{ or } \nu 2) < 45.5$ $$1.64 < \frac{N4 + N5}{2} < 1.76 \quad (5)$$

where F1 is the focal length of the divergent lens group; Ft is the longest focal length of the entire system; Et is the interval between the principal points of the divergent and convergent groups when in the telephoto end; $\nu 1$, $\nu 2$ and $\nu 3$ are the Abbe numbers of the 1st to 3rd lenses in the divergent lens group respectively; and N4, N5 and N6 are the refractive indices of the 1st to 3rd positive lenses counting from the front in the convergent lens group.

7 Claims, 52 Drawing Figures

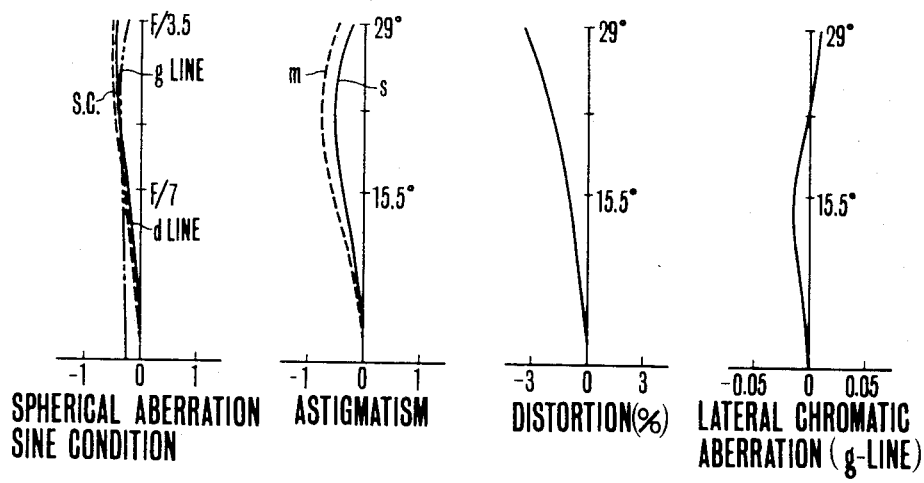
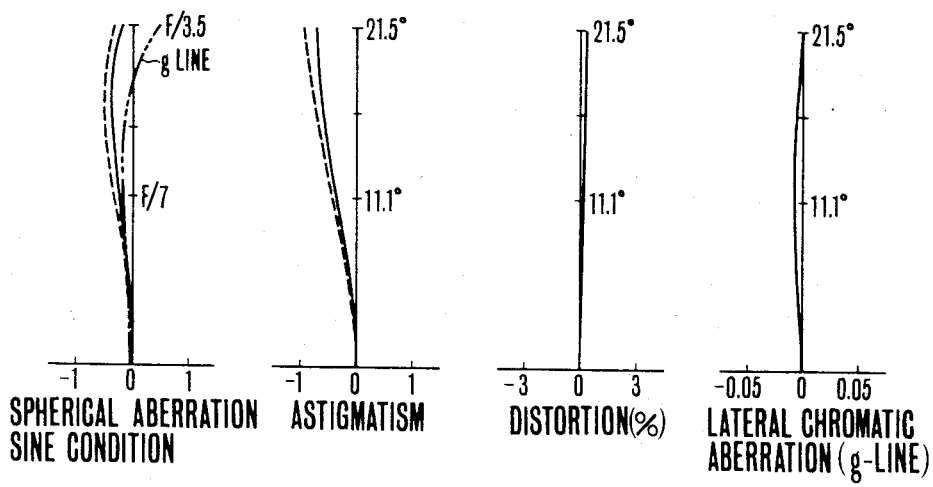

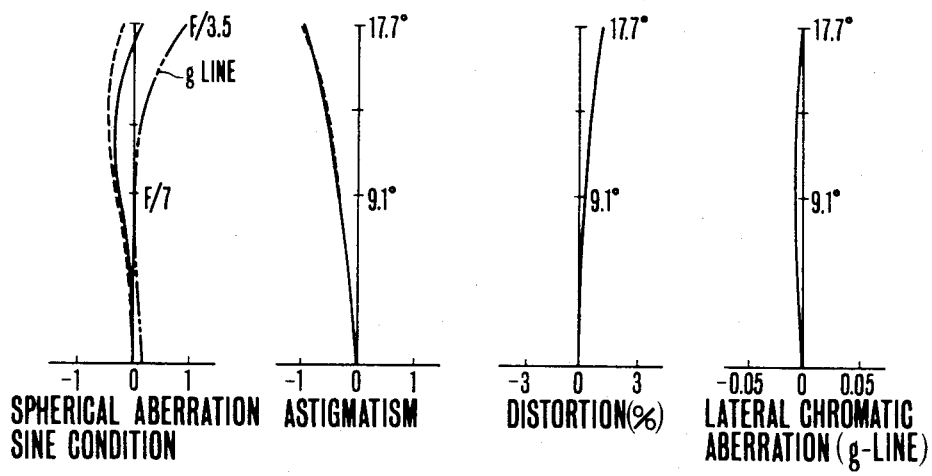
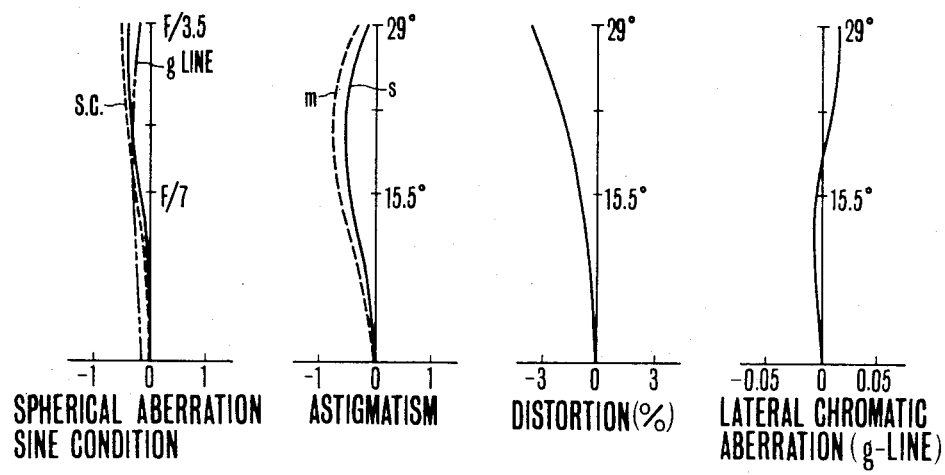

FIG.9A FIG.9B FIG.9C FIG.9D
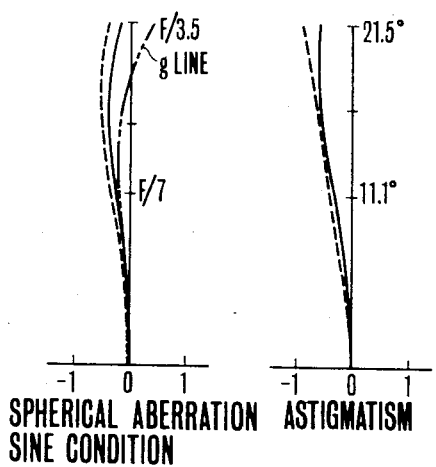
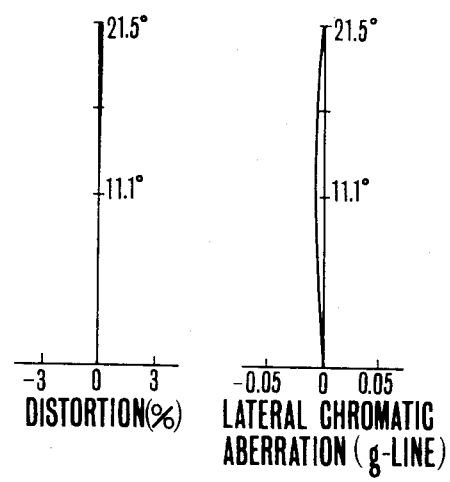
FIG.10A FIG.10B FIG.10C FIG.10D
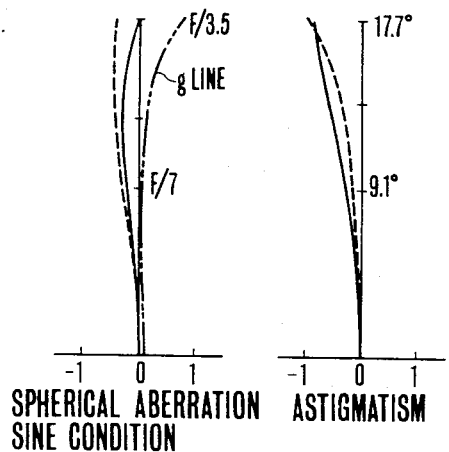
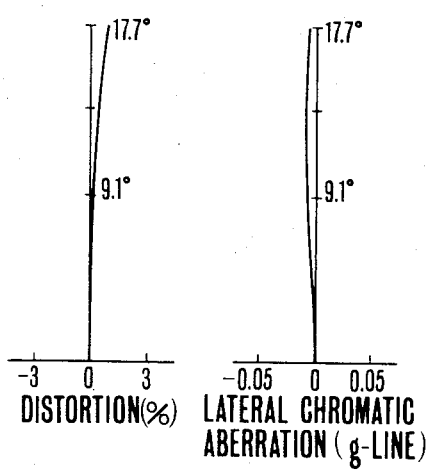

ZOOM OBJECTIVE OF SMALL SIZE

BACKGROUND OF THE INVENTION

This invention relates to inverted telephoto type zoom objectives, particularly those in which the air space between the divergent front and the convergent rear lens groups varies throughout a range of magnifications.

Various types of zoom lenses have been developed for the purpose of preserving image quality when the lens is zoomed to wide angle positions. These lenses may be classified into two main groups, depending upon the difference in aberration corrections, namely, one which is called the "positive lead form" in which the frontmost component is in the form of a positive lens and another group which is called the "negative lead form" in which the frontmost component is in the form of a negative lens. Examples of the positive lead form appear in U.S. Pat. Nos. 4,169,660, 4,142,779, and 4,147,410. On the other hand, examples of the negative lead form are shown in U.S. Pat. Nos. 3,848,969 and 4,155,629.

The present inventor has proposed a zoom lens of the negative lead form in Japanese Open Patent Sho 53-132360 (U.S. Patent application, Ser. No. 898,807). In the embodiments described in this patent application, the front lens group must be reciprocated to zoom the lens throughout its entire range. This imposes a significant limitation on the construction of the lens barrel mechanism. If the lens could be zoomed over its full range with a linear axial movement, and the front and rear lens groups could be varied unidirectionally in relation to each other, it would be possible to employ a control mechanism with an actuator which zooms the lens by imparting a straight movement thereto.

The chief point to be considered in this connection is that the prior art has already developed zoom objectives for adaptation to such control mechanisms, and they have the advantage that the optical system, when zoomed to the telephoto position, assumes its shortest physical length. Such zoom objectives have the drawback that the diameter of the frontmost lens is increased substantially when the image angle is increased in the wide angle position, or when the focusing range is extended to include shorter distances.

SUMMARY OF THE INVENTION

It is a principal object of the present invention to achieve a high zoom ratio without imparting into the divergent lens group a reciprocating movement as the zoom lens is zoomed from the longest focal length to the shortest focal length position.

Another object is to well correct the various aberrations provided that the zoom lens has a power distribution so chosen as to accomplish the principal object.

Still another object is to prevent the increase of the diameter of the front member despite a wide image angle.

To achieve the above objects, as a zoom objective comprises a divergent front lens group I and a convergent rear lens group II with an air spacing therebetween being variable for zooming, the divergent lens group consists, from front to rear, of a negative meniscus lens with its convex surface toward the front, a bi-concave lens and a positive lens with its convex surface of strong curvature toward the front, where the last lens is preferably in the form of a positive meniscus lens. Another feature is that the air lens defined by the bi-concave lens and the positive lens has a converging effect. In other words, the radius of curvature of the rear surface of the bi-concave lens is larger than that of curvature of the front surface of the positive lens. The convergent lens group consists, from front to rear, of a positive lens with its convex surface of strong curvature toward the front, two positive meniscus lenses with their convex surfaces toward the front, a negative lens and a positive lens. Letting Fl denote the focal length of the divergent lens group, Ft the longest focal length of the entire system, Et the interval between the principal points of the divergent and the convergent lens groups when in the telephoto end, $\nu 1$, $\nu 2$ and $\nu 3$ the Abbe numbers of the first to third lenses in the divergent lens group respectively, and N4 and N5 the refractive indices of the first and second positive lenses in the convergent lens group respectively, the zoom objective fulfills the following requirements:

$$1.08 \leq \frac{|Fl|}{Ft} < 1.255 \quad (1)$$

$$0.08 < \frac{Et}{Ft} < 0.195 \quad (2)$$

(3) $\nu 3 < 35$ (4) $32 < $ (at least either one of $\nu 1$ and $\nu 2) < 45.5$ $$1.64 < \frac{N4 + N5}{2} < 1.76 \quad (5)$$

Under these requirements, the negative meniscus lens in the divergent group is configured so as to permit as little barrel type distortion as possible to produce in the wide angle settings, and that the astigmatism also is well corrected. The converging air lens formed by the negative lens in the bi-concave form and the rearwardly positioned positive lens serves to minimize the over-corrected spherical aberration which would be otherwise largely produced from the divergent group particularly when in the telephoto settings. Further, the overall axial thickness of the divergent group is made as thin as possible, thus contributing to a compactness of the lens system, and these three lenses are configured so that the rear principal point of the divergent group lies as near to the image end as possible so as to avoid the mechanical interference between the divergent and the convergent lens groups when zoomed to the telephoto end.

It is next noted that the fact that all the first three positive lenses counting from the front in the convergent group have their front surfaces strongly curved to forward convexity facilitates an approach of the front principal point of the convergent group as near to the object side as possible. This feature cooperates with the above-described one to assure that even when the interval between the principal points of the divergent and the convergent groups in the telephoto position is shortened to some extent, no mechanical interference between them occurs, thereby it being made possible to provide a compact completed objective. It is also throughout the entire zooming range that these three positive lenses are responsible for under-corrected astigmatism and it is in the telephoto positions that they are responsible for more under-corrected spherical aberration. These aberrations are to be compensated by the suitable design of the negative lenses. In this connection it should be explained that in order that the astigmatism and the spherical aberration are compensated for simultaneously to a more adequate magnitude, the rear surfaces of the negative lenses are configured to rearwardly concave surfaces of at least strong curvature. The last or positive lens in the convergent group is flexible in configuration to such extent that the back focus in the wide angle position is maintained at the necessary level, and functions to establish a good balance of the image aberrations.

BRIEF DESCRIPTION OF THE DRAWINGS

FIGS. 5 to 7 are graphic representations of the various aberrations of Example 1 lens when in the wide angle, middle and telephoto positions respectively.

FIGS. 8 to 10 are graphic representations of the various aberrations of Example 2 lens when in the wide angle, middle and telephoto positions respectively.

DESCRIPTION OF THE PREFERRED EMBODIMENTS

Figure 1:
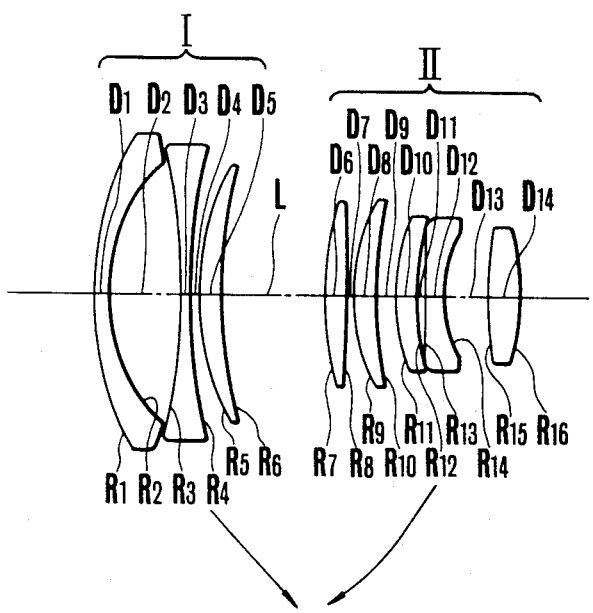
FIG. 1 is an optical diagram of Example 1 of a zoom lens of the present invention.
Figure 2:
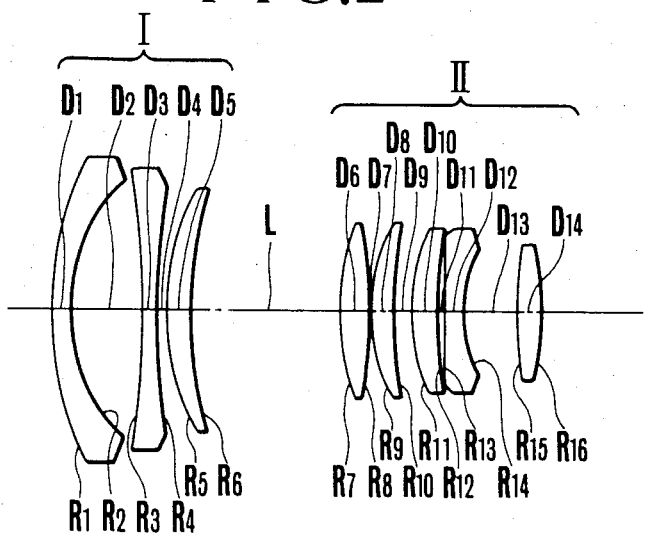
FIG. 2 is an optical diagram showing Example 2 of the invention.
Figure 3:
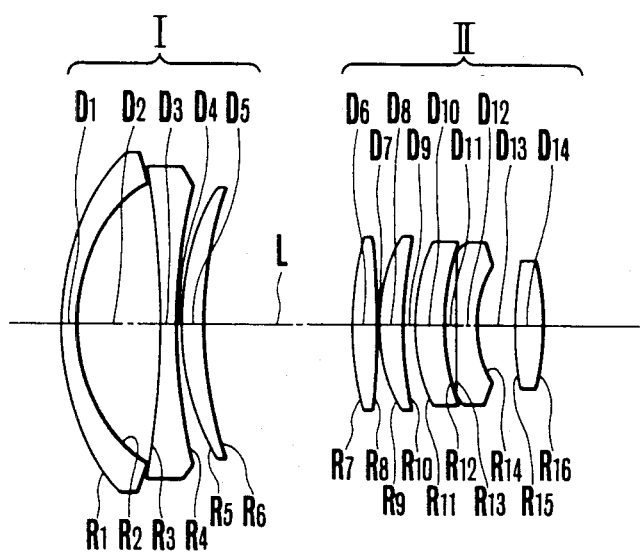
FIG. 3 is an optical diagram showing Example 3 of the invention.
Figure 4:
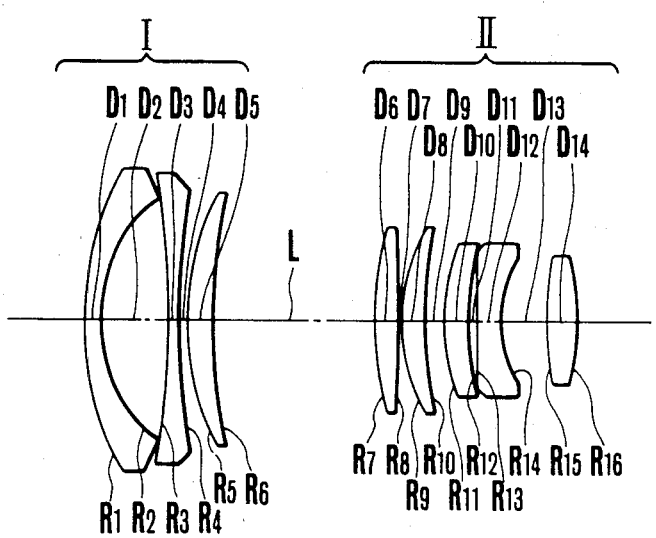
FIG. 4 is an optical diagram showing Example 4 of the invention.
Figures 11A, 11B, 11C, 11D:
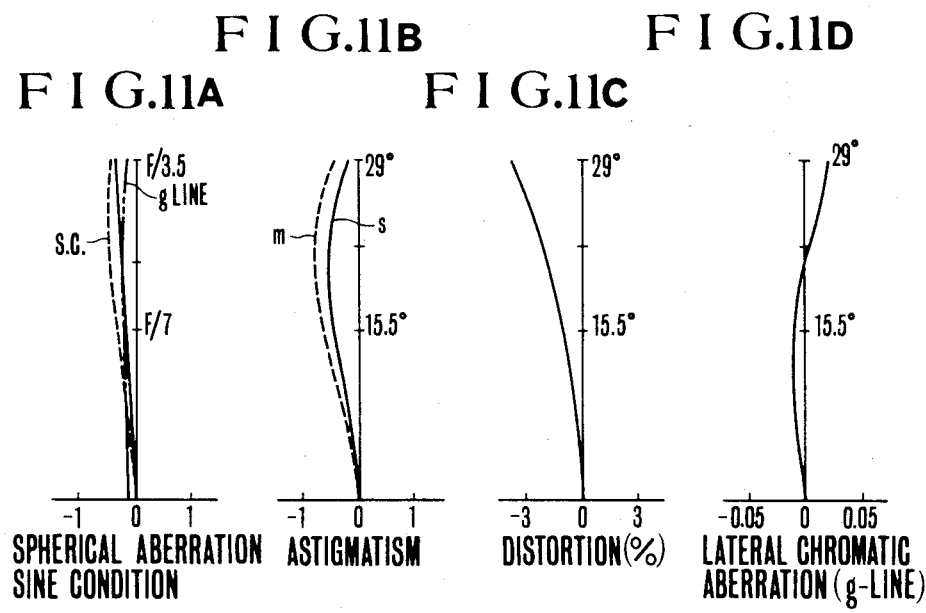
FIGS. 11 to 13 are graphic representations of the various aberrations of Example 3 lens when in the wide angle, middle and telephoto positions respectively.
Figures 12A, 12B, 12C, 12D:
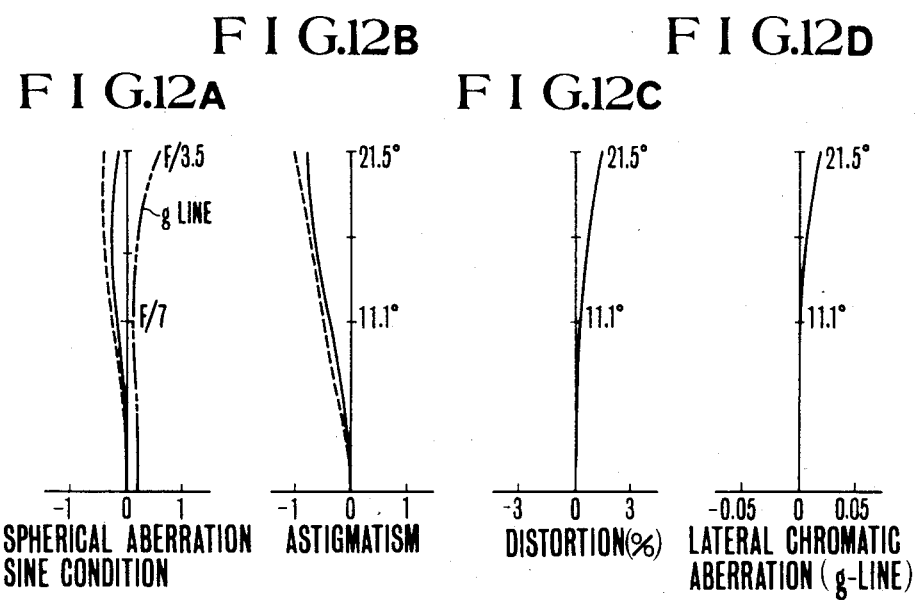
Figures 13A, 13B, 13C, 13D:
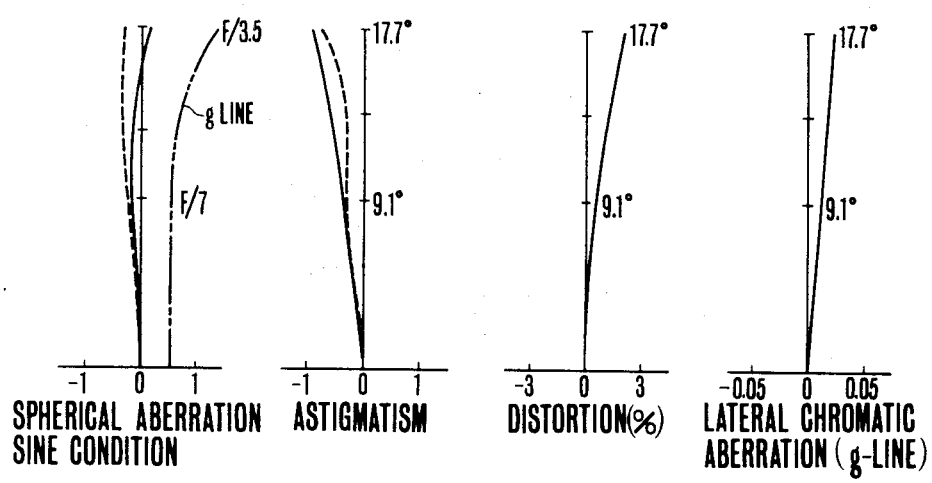
Figures 14A, 14B, 14C, 14D:
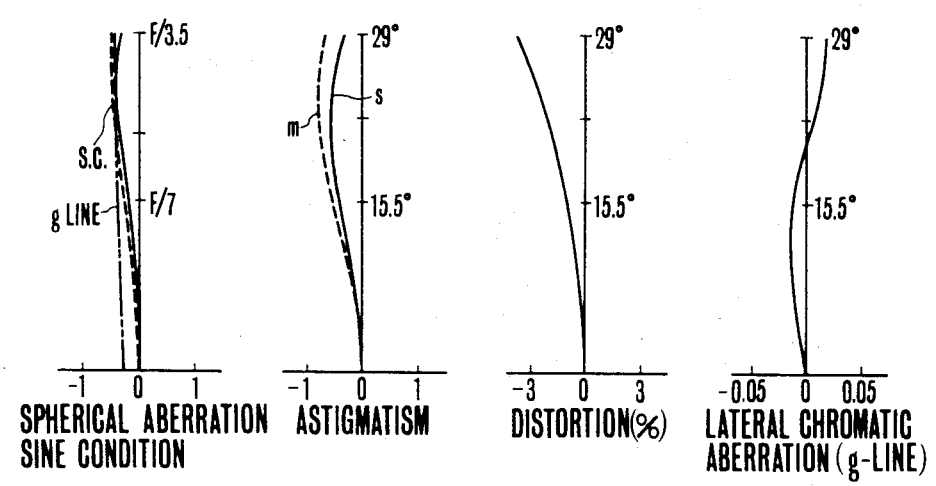
FIGS. 14 to 16 are graphic representations of the various aberrations of Example 4 lens when in the wide angle, middle and telephoto positions respectively.
Figures 15A, 15B, 15C, 15D:
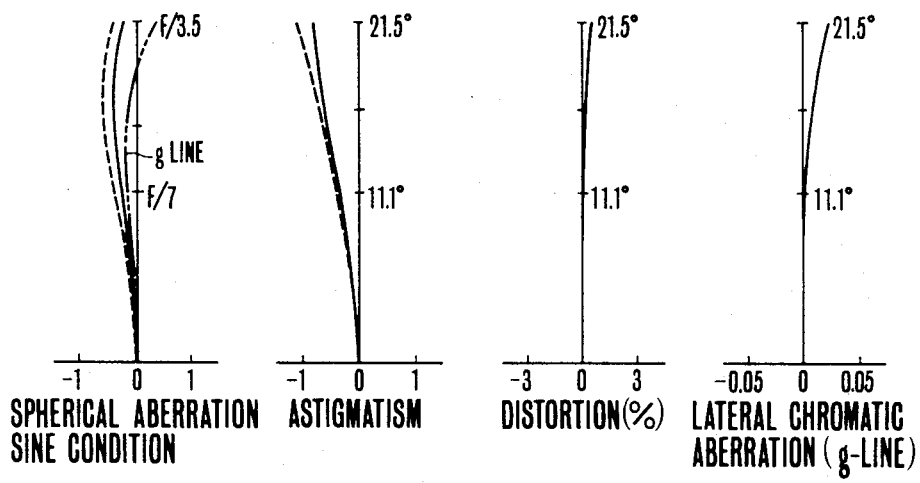
Figures 16A, 16B, 16C, 16D:
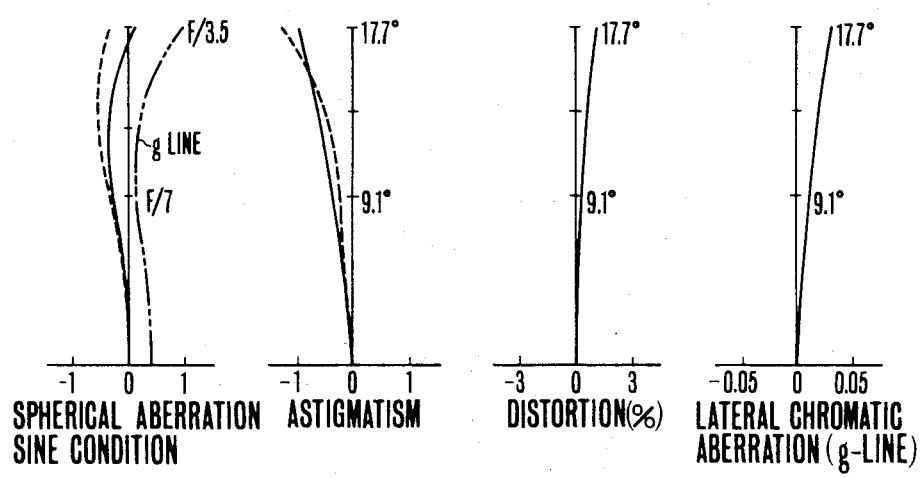

In the zoom lenses depicted in FIGS. 1 to 4, I denotes a divergent group, and II denotes a convergent group. To effect zooming, the divergent group I moves along a linear track, and the convergent group II moves along a non-linear track. L denotes the air spacing between the both groups.

In the following the significances of the above-described conditions (1) to (5) are explained.

Condition (1) makes it possible to realize a lens configuration for one-directional axial movement of the divergent group throughout an entire range of variation of the focal length of the entire system, and makes compact the entire lens system. The zoom system in which the one-directional axial movement of the divergent group suffices to perform the full-range zooming is possible in the standpoint of the principle provided that the factor (1) is larger than unity. But, when it is very near 1.0, the required amount of movement of the convergent group relative to the movement of the divergent group near the telephoto positions takes a considerably large value, and it is difficult to perform smooth zooming operation. Therefore, at least 1.08 is set forth. On the other hand, the larger the value of factor (1), the smaller the required amount of movement of the convergent group relative to the movement of the divergent group near the telephoto positions is so that the zooming operation can be performed smoothly. But instead the required amount of movement of the divergent group is increased to effect an equivalent zoom ratio. Further, in order to obtain an equivalent focusing range, the amount of independent axial movement of the divergent group must be increased considerably. Therefore, the total length of the lens is extremely elongated in the wide angle settings, and the increase in the total axial movement of the divergent group for focusing calls for a remarkable increase in the diameter of the front lens member. On this account, it is desired that the value of factor (1) is smaller than 1.255.

Condition (2) facilitates a compactness of the entire lens system, while still preserving high image quality. When the upper limit is exceeded, the maximum effective diameter of photographing beam for the convergent group becomes too large. As a result, it is not suited to increase the relative aperture. Further, the back focus in the wide angle position becomes longer than necessary, thus increasing the bulk and size of the lens system. When the lower limit is exceeded, when in the telephoto positions, the air spacing between the divergent and the convergent groups takes a minus signal, thus giving rise to a drawback such as that of causing them to substantially mechanically interfere with each other.

Condition (3) contributes to the compactness of the entire lens system and particularly to a minimization of the diameter of the front lens member while still remarkably improving the state of correction of the image aberrations, and, along with condition (4), is very closely correlated to condition (1). First, since the divergent group is of negative power, in order to achieve a good correction of the chromatic aberration of the divergent group, the positive lens in the divergent group must be conditioned at least by selecting a glass material of high dispersion with an Abbe number of smaller than 35 for use therein. On the other hand, as is understandable from the well known list of optical glasses, the lower limit of the range of Abbe numbers available is found to be about 20. Upon taking into account the stability of the glass quality, it will be safe to lay the lower limit on 23.

It is then noted that in order to minimize the diameter of the front lens member while still maintaining the excellent state of correction of the image aberrations, the power of each individual lens of the three in the divergent groups must be somewhat strongly maintained. Therefore, in order to achieve a good compromise between the requirements of imparting somewhat stong powers into the above-described lenses within the framework of the overall power of the divergent group defined by condition (1) and of well correcting the divergent group for chromatic aberration, at least either one of the two negative lenses within the divergent group must be made up from a glass material of somewhat high dispersion as is required to lie between 32 and 45.5 in terms of Abbe number. When the lower limit is exceeded, the powers of the individual lenses in the divergent group becomes too strong to increase the range of variation of the distortion over the zooming range and the width of the lateral chromatic aberration zone in the wide angle positions. Moreover, it becomes difficult to well correct for the residual chromatic aberration from the divergent group. Thus, it is no longer hoped to improve the imaging performance. When the upper limit is exceeded, the powers of the individual lenses in the front group becomes too weak to increase the diameter of the front member. Further, the inward coma in the wide angle and telephoto positions and the outward coma in the middle positions become very objectionable.

It should be pointed out that what is essentially different from the prior art, for example, Japanese Open Patent Sho 53-132360 is in conditions (1) and (3).

Condition (5) is responsible for good correction of field curvature and spherical aberration. Of the first three positive lenses counting from the front in the convergent group, the power of each of the first two lenses becomes stronger than that of the third positive lens. With the use of somewhat high refractive glass material in the first and second lenses, therefore, the Petzval sum can be very effectively minimized. Further since the front surfaces of the first and second lenses produce large under-corrected spherical aberration, the use of the glass material of high refractive index is advantageous to good correction of the spherical aberration. When the lower limit is exceeded, the Petzval sum becomes large, and the field curvature is increased. Also the zonal spherical aberration particularly in the telephoto positions is increased. Thus, it is no longer possible to achieve the increase in the imaging performance. When the upper limit is exceeded, the Petzval sum is conversely too much reduced, and in extreme cases, takes a minus value so that the good correction of lateral aberration causes the astigmatic difference to increase largely.

Next, since the convergent group has a converging effect, in order to well correct the convergent group for chromatic aberration, it is desirable to use low dispersion glasses in at least the first three positive lenses, and high dispersion glasses in the negative lenses. That is, one method is to select glass materials having Abbe numbers of at least 45 for use in the first three positive lenses in the rear group, and those having Abbe numbers of less than 35 for use in the negative lenses, while the refractive indices of these glass materials are more than 1.75.

As can be seen from the following specific embodiments, a zoom objective of small size has eight lens elements constituting eight components with an image angle ranging from 58° to 35.4° and an F-number of 3.5, while nevertheless an extreme compactness is achieved as the total length (from the front vertex to the image plate) in the telephoto end is, for example, in Example 1, equal to 2.52 times the shortest focal length and high grade imagery is preserved throughout the zooming range.

EXAMPLE 1

Focal Length f = 100–173.85 F/3.5   Image Angle 2ω = 58°–35.4°

| Radius of Curvature | | Axial Thickness & Separation | | Refractive Index(Nd) | | Abbe Number |
|---|---|---|---|---|---|---|
| R1 | 106.447 | D1 | 5.13 | N1 | 1.72342 | ν1 | 38 |
| R2 | 59.204 | D2 | 24.44 | | | | |
| R3 | −275.618 | D3 | 4.36 | N2 | 1.51633 | ν2 | 64.1 |
| R4 | 258.402 | D4 | 1.92 | | | | |
| R5 | 92.544 | D5 | 8.72 | N3 | 1.7552 | ν3 | 27.5 |
| R6 | 176.241 | L | | | | | |
| R7 | 127.664 | D6 | 7.07 | N4 | 1.6968 | ν4 | 55.5 |
| R8 | −1858.91 | D7 | 0.26 | | | | |
| R9 | 61.033 | D8 | 8.45 | N5 | 1.6968 | ν5 | 55.5 |
| R10 | 189.998 | D9 | 5.9 | | | | |
| R11 | 74.301 | D10 | 8.13 | N6 | 1.60311 | ν6 | 60.7 |
| R12 | 115.788 | D11 | 2.55 | | | | |
| R13 | 1619.31 | D12 | 6.71 | N7 | 1.80518 | ν7 | 25.4 |
| R14 | 43.638 | D13 | 15.98 | | | | |
| R15 | 269.518 | D14 | 7.07 | N8 | 1.63636 | ν8 | 35.4 |
| R16 | −122.982 | | | | | | | f   100   141   173.85
L   89.98  29.44  1.58

$$\frac{|F_1|}{F_t} = 1.136$$

$$\frac{E_t}{F_t} = 0.159$$

EXAMPLE 2

Focal Length f = 100–173.85 F/3.5   Image Angle 2ω = 58°–35.4°

| Radius of Curvature | | Axial Thickness & Separation | | Refractive Index | | Abbe Number |
|---|---|---|---|---|---|---|
| R1 | 117.008 | D1 | 5.13 | N1 | 1.66892 | ν1 | 45 |
| R2 | 58.976 | D2 | 24.68 | | | | |
| R3 | −301.507 | D3 | 4.36 | N2 | 1.51633 | ν2 | 64.1 |
| R4 | 284.051 | D4 | 2.3 | | | | |
| R5 | 89.933 | D5 | 7.97 | N3 | 1.7552 | ν3 | 27.5 |
| R6 | 154.755 | L | | | | | |
| R7 | 126.296 | D6 | 7.67 | N4 | 1.6968 | ν4 | 55.5 |
| R8 | −641.638 | D7 | 0.26 | | | | |
| R9 | 58.172 | D8 | 8.83 | N5 | 1.60311 | ν5 | 60.7 |
| R10 | 186.65 | D9 | 5.9 | | | | |
| R11 | 71.955 | D10 | 8.04 | N6 | 1.60311 | ν6 | 60.7 |
| R12 | 105.556 | D11 | 2.69 | | | | |
| R13 | 1604.26 | D12 | 6.32 | N7 | 1.80518 | ν7 | 25.4 |
| R14 | 43.765 | D13 | 19.03 | | | | |
| R15 | 265.422 | D14 | 6.79 | N8 | 1.63636 | ν8 | 35.4 |
| R16 | −123.904 | | | | | | | f   100   141   173.85
L   87.97  29.93  3.21

$$\frac{|F_1|}{F_t} = 1.081$$

$$\frac{E_t}{F_t} = 0.19$$

EXAMPLE 3

Focal Length f = 100–173.85 F/3.5   Image Angle 2ω = 58°–35.4°

| Radius of Curvature | | Axial Thickness & Separation | | Refractive Index(Nd) | | Abbe Number |
|---|---|---|---|---|---|---|
| R1 | 88.61 | D1 | 5.13 | N1 | 1.6727 | ν1 | 32.1 |
| R2 | 58.405 | D2 | 30.83 | | | | |
| R3 | −308.528 | D3 | 4.36 | N2 | 1.51633 | ν2 | 64.1 |
| R4 | 217.548 | D4 | 0.51 | | | | |
| R5 | 89.303 | D5 | 8.51 | N3 | 1.80518 | ν3 | 25.4 |
| R6 | 136.32 | L | | | | | |
| R7 | 133.497 | D6 | 6.82 | N4 | 1.6968 | ν4 | 55.5 |
| R8 | −752.32 | D7 | 0.26 | | | | |
| R9 | 57.521 | D8 | 8.32 | N5 | 1.60311 | ν5 | 60.7 |
| R10 | 189.339 | D9 | 3.08 | | | | |
| R11 | 70.772 | D10 | 10.65 | N6 | 1.60311 | ν6 | 60.7 |
| R12 | 98.344 | D11 | 3.15 | | | | |
| R13 | 874.583 | D12 | 7.76 | N7 | 1.80518 | ν7 | 25.4 |
| R14 | 42.628 | D13 | 13.86 | | | | |
| R15 | 203.964 | D14 | 6.91 | N8 | 1.63636 | ν8 | 35.4 |
| R16 | −138.779 | | | | | | | f   100   141   173.85
L   96.39  31.01  0.93

$$\frac{|F_1|}{F_t} = 1.25$$

$$\frac{E_t}{F_t} = 0.0885$$

EXAMPLE 4

Focal Length f = 100–173.85  F/3.5   Image Angle 2ω = 58°–35.4°

| | Radius of Curvature | | Axial Thickness & Separation | Refractive Index(Nd) | | Abbe Number |
|---|---|---|---|---|---|---|
| R1 | 115.208 | D1 | 5.13 | N1 | 1.60311 | ν1 60.7 |
| R2 | 56.68 | D2 | 22.72 | | | |
| R3 | −292.025 | D3 | 4.36 | N2 | 1.66892 | ν2 45 |
| R4 | 284.295 | D4 | 2.28 | | | |
| R5 | 94.875 | D5 | 9.5 | N3 | 1.6668 | ν3 33 |
| R6 | 270.102 | L | | | | |
| R7 | 127.162 | D6 | 7.12 | N4 | 1.6968 | ν4 55.5 |
| R8 | −1416.24 | D7 | 0.26 | | | |
| R9 | 62.791 | D8 | 8.53 | N5 | 1.6968 | ν5 55.5 |
| R10 | 193.695 | D9 | 5.74 | | | |
| R11 | 74.598 | D10 | 8.02 | N6 | 1.60311 | ν6 60.7 |
| R12 | 108.236 | D11 | 2.72 | | | |
| R13 | 1246.1 | D12 | 8.05 | N7 | 1.80518 | ν7 25.4 |
| R14 | 44.149 | D13 | 15.87 | | | |
| R15 | 234.386 | D14 | 8.64 | N8 | 1.63636 | ν8 35.4 |
| R16 | −128.867 | | | | | |

| f | 100 | 141 | 173.85 |
|---|---|---|---|
| L | 89.05 | 29.79 | 2.53 |

$$\frac{|F_1|}{F_t} = 1.106$$

$$\frac{E_t}{F_t} = 0.177$$

What is claimed is:

1. A zoom objective of small size including:
   a divergent lens group consisting of a negative meniscus lens having a front surface convex toward the front, a negative lens and a positive lens having a front surface of strong curvature convex toward the front, and axially movable for zooming, and
   a convergent lens group including three positive lenses and a negative lens followed by a positive lens, positioned on the image side of said divergent lens group and axially movable for zooming independently of said divergent lens group, said zoom objective fulfilling the following requirements:

$$1.08 \leq \frac{|F_1|}{F_t} < 1.255 \tag{1}$$

$$0.08 < \frac{E_t}{F_t} < 0.195 \tag{2}$$

(3) ν3 < 35

(4) 32 < (At least either one of ν1 and ν2) < 45.5

$$1.64 < \frac{N4 + N5}{2} < 1.76 \tag{5}$$

Where Fl is the focal length of the divergent lens group; Ft is the longest focal length of the entire system; Et is the interval between the principal points of the divergent and the convergent lens groups when in the telephoto end; ν1, ν2 and ν3 are the Abbe numbers of the three lenses in the divergent group; and N4 and N5 are the refractive indices of the first two lenses counting from the front in the convergent lens group respectively.

2. A zoom objective according to claim 1, wherein said divergent lens group consists of a negative meniscus lens of forward convexity, a bi-concave lens and a positive meniscus lens of forward convexity, the rear surface of said bi-concave lens and the front surface of said positive meniscus lens defining an air lens of converging effect, and said convergent lens group consists of a positive lens in the bi-convex form having a front surface of strong curvature convex toward the front, two positive meniscus lenses of forward convexity, a negative lens and a bi-convex lens.

3. A zoom objective according to claim 2 wherein the Abbe numbers of the first three positive lenses counting from the front in the convergent lens group are not less than 45, and the Abbe numbers of the negative lenses are not more than 35, while the refractive indices are not less than 1.75.

4. A zoom objective according to claim 1 and wherein said objective has the following characteristics:

Focal Length f = 100–173.85   F-number: 3.5   Image Angle 2ω = 58°–34.5°

| | Radius of Curvature | | Axial Thickness & Separation | Refractive Index(Nd) | | Abbe Number (νd) |
|---|---|---|---|---|---|---|
| R1 | 106.447 | D1 | 5.13 | N1 | 1.72342 | ν1 38 |
| R2 | 59.204 | D2 | 24.44 | | | |
| R3 | −275.618 | D3 | 4.36 | N2 | 1.51633 | ν2 64.1 |
| R4 | 258.402 | D4 | 1.92 | | | |
| R5 | 92.544 | D5 | 8.72 | N3 | 1.7552 | ν3 27.5 |
| R6 | 176.241 | L | | | | |
| R7 | 127.664 | D6 | 7.07 | N4 | 1.6968 | ν4 55.5 |
| R8 | −1858.91 | D7 | 0.26 | | | |
| R9 | 61.033 | D8 | 8.45 | N5 | 1.6968 | ν5 55.5 |
| R10 | 189.998 | D9 | 5.9 | | | |
| R11 | 74.301 | D10 | 8.13 | N6 | 1.60311 | ν6 60.7 |
| R12 | 115.788 | D11 | 2.55 | | | |
| R13 | 1619.31 | D12 | 6.71 | N7 | 1.80518 | ν7 25.4 |
| R14 | 43.638 | D13 | 15.98 | | | |
| R15 | 269.518 | D14 | 7.07 | N8 | 1.63636 | ν8 35.4 |
| R16 | −122.982 | | | | | |

| f | 100 | 141 | 173.85 |
|---|---|---|---|
| L | 89.98 | 29.44 | 1.58 |

5. A zoom objective according to claim 1 and wherein said objective has the following characteristics:

Focal Length f = 100–173.85   F-number: 3.5   Image Angle 2ω = 58°–35.4°

| | Radius of Curvature | | Axial Thickness & Separation | Refractive Index(Nd) | | Abbe Number (νd) |
|---|---|---|---|---|---|---|
| R1 | 117.008 | D1 | 5.13 | N1 | 1.66892 | ν1 45 |
| R2 | 58.976 | D2 | 24.68 | | | |
| R3 | −301.507 | D3 | 4.36 | N2 | 1.51633 | ν2 64.1 |
| R4 | 284.051 | D4 | 2.3 | | | |
| R5 | 89.933 | D5 | 7.97 | N3 | 1.7552 | ν3 27.5 |
| R6 | 154.755 | L | | | | |
| R7 | 126.296 | D6 | 7.67 | N4 | 1.6968 | ν4 55.5 |
| R8 | −641.638 | D7 | 0.26 | | | |
| R9 | 58.172 | D8 | 8.83 | N5 | 1.60311 | ν5 60.7 |
| R10 | 186.65 | D9 | 5.9 | | | |
| R11 | 71.955 | D10 | 8.04 | N6 | 1.60311 | ν6 60.7 |
| R12 | 105.556 | D11 | 2.69 | | | |
| R13 | 1604.26 | D12 | 6.32 | N7 | 1.80518 | ν7 25.4 |
| R14 | 43.765 | D13 | 19.03 | | | |
| R15 | 265.422 | D14 | 6.79 | N8 | 1.63636 | ν8 35.4 |
| R16 | −123.904 | | | | | |

| f | 100 | 141 | 173.85 |
|---|---|---|---|
| L | 87.97 | 29.93 | 3.21 |

6. A zoom objective according to claim 1 and wherein said objective has the following characteristics:

Focal Length f = 100–173.85   F-number: 3.5   Image Angle 2ω = 58°–35.4°

| Radius of Curvature | | Axial Thickness & Separation | | Refractive Index(Nd) | | Abbe Number (νd) | |
|---|---|---|---|---|---|---|---|
| R1 | 88.61 | D1 | 5.13 | N1 | 1.6727 | ν1 | 32.1 |
| R2 | 58.405 | D2 | 30.83 | | | | |
| R3 | −308.528 | D3 | 4.36 | N2 | 1.51633 | ν2 | 64.1 |
| R4 | 217.548 | D4 | 0.51 | | | | |
| R5 | 89.303 | D5 | 8.51 | N3 | 1.80518 | ν3 | 25.4 |
| R6 | 136.32 | L | | | | | |
| R7 | 133.497 | D6 | 6.82 | N4 | 1.6968 | ν4 | 55.5 |
| R8 | −752.32 | D7 | 0.26 | | | | |
| R9 | 57.521 | D8 | 8.32 | N5 | 1.60311 | ν5 | 60.7 |
| R10 | 189.339 | D9 | 3.08 | | | | |
| R11 | 70.772 | D10 | 10.65 | N6 | 1.60311 | ν6 | 60.7 |
| R12 | 98.344 | D11 | 3.15 | | | | |
| R13 | 874.583 | D12 | 7.76 | N7 | 1.80518 | ν7 | 25.4 |
| R14 | 42.628 | D13 | 13.86 | | | | |
| R15 | 203.964 | D14 | 6.91 | N8 | 1.63636 | ν8 | 35.4 |
| R16 | −138.779 | | | | | | |

| f | 100 | 141 | 173.85 |
|---|---|---|---|
| L | 96.39 | 31.01 | 0.93 |

7. A zoom objective according to claim 1 and wherein said objective has the following characteristics:

Focal Length f = 100–173.85   F-number: 3.5   Image Angle 2ω = 58°–35.4°

| Radius of Curvature | | Axial Thickness & Separation | | Refractive Index(Nd) | | Abbe Number (νd) | |
|---|---|---|---|---|---|---|---|
| R1 | 115.208 | D1 | 5.13 | N1 | 1.60311 | ν1 | 60.7 |
| R2 | 56.68 | D2 | 22.72 | | | | |
| R3 | −292.025 | D3 | 4.36 | N2 | 1.66892 | ν2 | 45 |
| R4 | 284.295 | D4 | 2.28 | | | | |
| R5 | 94.875 | D5 | 9.5 | N3 | 1.6668 | ν3 | 33 |
| R6 | 270.102 | L | | | | | |
| R7 | 127.162 | D6 | 7.12 | N4 | 1.6968 | ν4 | 55.5 |
| R8 | −1416.24 | D7 | 0.26 | | | | |
| R9 | 62.791 | D8 | 8.53 | N5 | 1.6968 | ν5 | 55.5 |
| R10 | 193.695 | D9 | 5.74 | | | | |
| R11 | 74.598 | D10 | 8.02 | N6 | 1.60311 | ν6 | 60.7 |
| R12 | 108.236 | D11 | 2.72 | | | | |
| R13 | 1246.1 | D12 | 8.05 | N7 | 1.80518 | ν7 | 25.4 |
| R14 | 44.149 | D13 | 15.87 | | | | |
| R15 | 234.386 | D14 | 8.64 | N8 | 1.63636 | ν8 | 35.4 |
| R16 | −128.867 | | | | | | |

| f | 100 | 141 | 173.85 |
|---|---|---|---|
| L | 89.05 | 29.79 | 2.53 |

* * * * *